United States Patent
Franchina et al.

(10) Patent No.: US 7,258,925 B2
(45) Date of Patent: Aug. 21, 2007

(54) FLUOROCHEMICAL FINISHES FOR PAINT APPLICATORS

(75) Inventors: Justine Gabrielle Franchina, Hockessin, DE (US); Peter Michael Murphy, Ooltewah, TN (US); Aaron Frank Self, Ringgold, GA (US); Richard Wayne Thompson, DePere, WI (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 192 days.

(21) Appl. No.: 10/866,055

(22) Filed: Jun. 11, 2004

(65) Prior Publication Data

US 2005/0008872 A1  Jan. 13, 2005

Related U.S. Application Data

(60) Provisional application No. 60/486,634, filed on Jul. 11, 2003.

(51) Int. Cl.
   *B32B 5/02*  (2006.01)
   *B32B 27/02*  (2006.01)
   *B32B 27/30*  (2006.01)
   *B32B 27/40*  (2006.01)

(52) U.S. Cl. .................. 428/421; 428/423.1; 15/207.2; 442/94

(58) Field of Classification Search .............. 428/421, 428/423.1, 537.1, 36.91; 15/207.2; 442/94
   See application file for complete search history.

(56) References Cited

U.S. PATENT DOCUMENTS

| | | | |
|---|---|---|---|
| 5,462,798 A | 10/1995 | Gueret | |
| 5,544,668 A | 8/1996 | Dollar | |
| 5,672,651 A | 9/1997 | Smith | |
| 5,749,117 A | 5/1998 | Forsline | |
| 5,827,919 A * | 10/1998 | May | ........................... 524/590 |
| 6,153,688 A | 11/2000 | Miura et al. | |
| 6,177,582 B1 | 1/2001 | Jenkner et al. | |
| 6,450,185 B1 | 9/2002 | Sallinen | |
| 6,451,717 B1 | 9/2002 | Fitzgerald et al. | |
| 6,479,605 B1 | 11/2002 | Franchina | |
| 6,525,127 B1 | 2/2003 | Jariwala et al. | |
| 7,152,526 B2 * | 12/2006 | Urata et al. | ................. 101/157 |

FOREIGN PATENT DOCUMENTS

| | | |
|---|---|---|
| EP | 1 038 919 A1 | 9/2000 |
| JP | 54-18994 | 2/1979 |
| JP | 60123442 A | 7/1985 |
| JP | 02258770 A | 10/1990 |
| JP | 02258822 A | 10/1990 |
| JP | 03006210 A | 1/1991 |
| JP | 1993345810 A | 12/1993 |
| JP | 1996173244 A | 7/1996 |
| WO | WO93/01349 | 1/1993 |
| WO | WO96/30584 | 10/1996 |
| WO | WO99/51430 | 1/1999 |
| WO | WO 02/14443 A2 | 2/2002 |
| WO | WO02/055464 A2 | 7/2002 |
| WO | WO 03/051953 A1 | 6/2003 |
| WO | WO 03/089712 A1 | 10/2003 |
| WO | WO 2004/011714 A2 | 2/2004 |
| WO | WO 2004/070105 A1 | 8/2004 |

* cited by examiner

*Primary Examiner*—Ramsey Zacharia

(57) ABSTRACT

Paint applicator having improved cleanability and paint-carrying capacity wherein the paint-carrying surface is coated or treated with a fluoroacrylate polymer or copolymer, a fluorourethane polymer or copolymer, or a mixture thereof, and a method for treating such paint applicators are disclosed.

12 Claims, No Drawings

FLUOROCHEMICAL FINISHES FOR PAINT APPLICATORS

FIELD OF THE INVENTION

This invention relates to the field of paint applicators having improved properties and to a method of treating the paint-carrying surfaces of the applicator with fluorochemical finishes.

BACKGROUND OF THE INVENTION

Paint rollers, paintbrushes and other applicators are widely used as applicators as a means of applying paint to surfaces. However, cleaning the applicators after their use is an unpleasant task because of the difficulty in removing all the paint from in between the paint-carrying fibers. Failure to remove all the paint will lead to fibers that are too stiff to provide a smooth painted surface, and with individual fibers that are too fouled and poorly separated to provide a suitable paint-carrying capacity. On the other hand, a very thorough cleaning typically requires many washings, with additional cleaning of the hands and containers used, generating large amounts of contaminated wash solvents for disposal.

Numerous mechanical devices have been patented to make the job of cleanup easier, for example, see U.S. Pat. No. 6,450,185. Such devices are complicated and few people ever purchase, use and/or maintain them.

U.S. Pat. No. 5,462,798 discloses a brush aimed at applying a thick liquid cosmetic product to a surface. It uses a monofilament fiber made of plastic containing from 0.2 to 15% by weight of an agent for improving the slip characteristic of the fiber and for reducing its wettability by water and/or other solvents. These ingredients are incorporated within the body of the fiber, with the result that the disclosed brush requires the use of expensive, custom-made brush filaments.

In the production of synthetic fibers for use as textiles and carpets, it is known that the synthetic fibers may be treated with a polymeric fluoroprotectant composition to improve stain resistance, oil repellency and water repellency. No reference to the application of such fluoroprotectant compositions to fabric or filaments used for paint applicators was located, nor any teaching that such application will make it easier to remove paint from such applicators.

There is a need for paint applicators, such as paint roller covers and brushes, that are easier to clean. It would be even more advantageous if these applicators surprisingly had increased the paint-carrying capacity during use. The present invention provides such paint applicators.

SUMMARY OF THE INVENTION

The present invention comprises a paint applicator comprising a paint-carrying surface which is coated or treated with a fluoroacrylate polymer or copolymer, a fluorourethane polymer or copolymer, or a mixture thereof. The present invention further comprises a method of treating a paint applicator comprising application to its paint-carrying surface, or the precursor thereof, of a fluoroacrylate polymer or copolymer, a fluorourethane polymer or copolymer, or a mixture thereof.

DETAILED DESCRIPTION OF THE INVENTION

Trademarks are denoted herein by capitalization.

This invention comprises a paint applicator that has improved painting capability and/or increased cleanability and a method for its production. A paint applicator, such as a roller, paintbrush or other applicator, is produced wherein the paint-carrying surface is coated with a fluoroacrylate and/or fluorourethane polymer or copolymer using techniques such as spraying, foaming, kiss coating and dipping followed by curing. Curing of the fabric, fibers, or filaments comprising the surface is typically at a temperature of from about 100° C. to about 190° C. for a time period of at least 30 seconds. The finish on the paint-carrying fibers, such as a fabric or filament, typically contains from about 0.05% to about 20% active ingredient on the weight of the fiber.

This invention further comprises methods for treating a paint applicator, or the fabrics, fibers or filaments that make up the paint-carrying surface, with various fluoroacrylate polymers or copolymers or fluorourethane polymers or copolymers, or mixtures thereof.

The present invention provides a paint applicator, having improved paint-carrying capacity and/or increased cleanability and processes for its preparation. The paint applicator of the present invention comprises various embodiments such as paint rollers, paintbrushes, paint pads, patterned rollers, patterned pads, paint sponges, paint clothes and other physical forms wherein the paint-carrying surface has been coated or treated with a fluoroacrylate and/or a fluorourethane polymer or copolymer, or a mixture thereof.

One embodiment of the paint applicator of the present invention comprises a paint roller. A paint roller consists of a removable roller cover made of a napped fabric which is placed on a rolling mechanism with a handle. Typically, the roller cover is made by a manufacturing process such as the following: First, one or more types of staple fibers are mixed, combed, carded and knitted. The knitted fabric is then fed to a backcoating machine where a latex backing is applied and cured. The fabric is then cut and wound around a plastic roller, where it is held in place by glue or by melting the backing onto the fabric. It is then combed and sheared and cut to the proper length for a roller. The nap length of the fabric can range from ¼ inch (0.6 cm) to about 1½ inches (3.8 cm). The fabric is typically made of nylon or polyester fibers, but may also include other synthetic or natural fibers. The roller surface can be flat or patterned. The roller covers useful for this invention can be made by the above manufacturing process, or by any other manufacturing process.

This invention further comprises a method for preparing a paint applicator, such as a roller cover, with improved paint-carrying capacity and/or increased cleanability, wherein the surface of the paint-carrying fibers are coated or treated with a fluoroacrylate polymer or copolymer, a fluorourethane polymer or copolymer, or a mixture thereof, at any stage prior to and during the applicator-manufacturing process.

A second embodiment of the paint applicator of this invention comprises a paintbrush. A paintbrush is made by mixing filaments of the same or different lengths, organizing them into filament bundles with parallel filaments, putting the filament bundles into a metal ferrule along with an adhesive such as epoxy resin or glue, curing or drying the adhesive, and attaching the paintbrush handle to the ferrule. The length of the filaments and the number of filaments in a brush will vary with the intended application. The filaments are typically nylon or polyester fibers, but may instead be other synthetic or natural fibers for certain applications. The brushes of this invention can be made by the above manufacturing process, or by any other manufacturing process.

This invention further comprises a method for preparing a paint applicator, such as a paintbrush, with increased cleanability, wherein the surface of the paint-carrying fibers are coated or treated with a fluoroacrylate polymer or copolymer, a fluorourethane polymer or copolymer, or a mixture thereof, at any stage of the brush manufacturing process.

Other embodiments of the present invention include paint pads, mats, clothes, sponges, combs, papers, feathers, styluses, knives, and other applicator tools treated with a fluoroacrylate and/or fluorourethane polymer or copolymer, or a mixture thereof.

In the present invention, a fluoroacrylate polymer or copolymer is coated onto the paint carrying fibers, filaments, or fabrics used in the paint-carrying surface of the paint applicators. The term "fluoroacrylate polymer or copolymer" is used herein to mean a polymer or copolymer containing a perfluoroalkyl (meth)acrylate group. "(Meth) acrylate" is used herein to mean an acrylate, a methacrylate, or mixture of the two. Many of the fluoroacrylate polymers or copolymers described in the literature today contain up to about 50% by weight of a long-chain alkyl (meth)acrylate group. To modify their properties, they may also contain smaller percentages of vinyl chloride, vinylidene chloride or other monomers, and/or small percentages of various cross-linking monomers such as a hydroxyethyl (meth)acrylate, an ethoxylated (meth)acrylate, and/or N-methylol (meth)acrylamide.

A preferred composition, either alone or in combination with fluorourethanes, is the fluoroacrylate polymer used in the included examples. The preferred composition is comprised of monomers copolymerized in the following percentages by weight:

(a) from about 50% to about 85% of a monomer of formula I:

$$R_f\text{—}CH_2CH_2\text{—}OC(O)\text{—}C(R)\text{=}CH_2 \qquad \text{I}$$

(b) from about 10% to about 25% of a monomer of formula II:

$$R_2\text{—}OC(O)\text{—}C(R)\text{=}CH_2 \qquad \text{II}$$

(c) from 0.1% to about 5% of a monomer of the formula III $$HO\text{—}CH_2CH_2\text{—}OC(O)\text{—}C(R)\text{=}CH_2 \qquad \text{III}$$

(d) from 0.1% to about 5% of a monomer of the formula IV:

$$H\text{—}(OCH_2CH_2)_m\text{—}O\text{—}C(O)\text{—}C(R)\text{=}CH_2 \qquad \text{IV}$$

(e) from 0.1% to about 3% of a monomer of the formula V:

$$HO\text{—}CH_2\text{—}NH\text{—}C(O)\text{—}C(R)\text{=}CH_2 \qquad \text{V}$$

wherein $R_f$ is a straight or branched-chain perfluoroalkyl group of from 2 to about 20 carbon atoms, each R is independently H or $CH_3$; $R_2$ is an alkyl chain with 2 to about 18 carbon atoms; and m is 2 to about 10.

The preferred copolymer composition optionally further comprises:

(f) from 0% up to about 10% of vinylidene chloride (formula VI) or vinyl acetate (formula VII), or a mixture thereof:

$$CH_2\text{=}CCl_2 \qquad \text{VI}$$

$$CH_3\text{—}(O)COCH\text{=}CH_2 \qquad \text{VII}$$

The term "fluorourethane polymer or copolymer" is used herein to mean a polymer or copolymer having perfluoroalkyl-containing groups reacted with any polyisocyanate having three or more isocyanate groups to form polyurethanes. The perfluoroalkyl-containing groups are attached to the polymer network through any number of nucleophilic atoms such as nitrogen, oxygen and sulfur. To modify the polymer properties, the polymer may also contain smaller percentages of polyethylene/polypropylene glycol or a mixture of the two or other monomers containing one or more reactive end groups which will react with isocyanates. A polymer network is then formed through cross-linking of residual isocyanate groups with a specific amount of water.

Generally, the fluorourethane polymers used in the examples of the present invention, either in combination with a fluoroacrylate or alone, contain at least one urea group and are the reaction products, of (A), (B), (C), and (D) below:

(A) at least one organic polyisocyanate or mixture of organic polyisocyanates which contains at least three isocyanate groups per molecule. The preferred polyisocyanates are selected from the group consisting of commercially available polyisocyanate resins such as DESMODUR N-100, DESMODUR N-3200, and DESMODUR N-3300. The DESMODUR family of resins is available from the Bayer Corporation, Pittsburg, Pa.

(B) at least one fluorochemical compound of the following composition:

$R_f$—X—Y—H, wherein $R_f$ is a $C_2$-$C_{20}$ linear or branched fluoroalkyl group, X is —$(CH_2)_n$—[, —$(CH_2)_g SO_2 (CH_2)_t$—] or [—$SO_2N(R_1)CH_2CH_2$—,] $SO_2N(R_2)CH_2CH_2$— wherein n is 2: [and] Y is —O—,—S—,—N$(R_2)$—; in which $R_2$ is H or an alkyl group containing 1-6 carbons.

(C) one or more hydrophilic, water-solvatable reagents which contain a single functional group which has at least one reactive H. An example of this is Carbowax 750, a methoxypolyethylene glycol with a molecular weight of about 750, available from Union Carbide Co; Danbury, Conn.

(D) water.

Reactants (B) and (C) are reacted with 55-95% of the said isocyanate groups in reactant (A), and then water is reacted with the 5% to 100% of the remainder of the said isocyanate groups.

Fluoroacrylates and fluorourethanes suitable for use in coating or treating the surface of the paint-carrying fabrics, filaments, or fibers are available commercially under tradenames such as "TEFLON", "DURATECH", and ZONYL" from E.I. du Pont de Nemours and Company, Wilmington, Del., "OLEOPHOBOL" from Ciba Specialty Chemicals, High Point, N.C., "MILEASE" from ICI, Wilmington, Del., "ASAHIGARD" from Asahi, Japan, "SCOTCHGARD" from 3M, Minneapolis, Minn., "SOFTTECH" from Dyetech, Dalton, Ga., "TEX-TEL" from Atochem, France, "NK GARD" from Nicca, Japan, and "NANOPEL" from Nanotex, Greensboro, N.C., among other such sources.

The fluoroacrylate polymer or copolymer, fluorourethane polymer or copolymer, or mixture thereof, is used in-the form of an aqueous emulsion. The polymers or copolymers are applied to the paint-carrying fabric, filaments, or fibers either alone or in a mixture with other treatment agents or finishes. For example, during the application process, the fluoroacrylate and/or fluorourethane may also be blended with a blocked isocyanate extender such as HYDROPHOBOL XAN (Ciba Specialty Chemicals, High Point, N.C.) and a wetting agent such as ALKANOL 6112 (E.I. du Pont de Nemours and Company, Deepwater, N.J.) to increase durability of the finish and increase spreading of the polymer on the fiber surface. The fluorochemicals are applied to the paint-carrying fabric, filaments, or fibers by spraying, foaming, dipping, padding, or other well-known methods, commonly used to impart oil-, soil- and water-repellency to textiles and carpets.

For roller cover fabric, a preferred method of applying the polymer is by applying the polymer emulsion to the precursor of the paint-carrying fibers of the roller, which is the fibers, filaments, or fabric prior to attachment to the roller. Preferably the polymer or copolymer emulsion is applied to the knitted fabric on a back-coating machine, against the force of gravity, by means of a press roll. This method is an adaptation of the method disclosed for applying certain other repellent finishes to the secondary backing of carpets in U.S. Pat. No. 5,558,916. This patent includes a detailed description of the mechanics of this method, and is incorporated by reference herein in its entirety. After excess liquid has been removed, for example by squeeze rolls, the treated roller cover fabric is dried and then cured by heating, for example, from about 100° C. to about 190° C., for at least about 30 seconds, typically from about 60 to about 180 seconds. Such curing enhances coating durability. While these curing conditions are typical, some commercial apparatus may operate outside these ranges because of its specific design features. The treated roller cover fabric contains from about 0.05% to about 20% fluoroacrylate or fluorourethane polymer or copolymer on the weight of the fiber or substrate. Preferably the amount is from about 0.1% to about 6%.

A preferred method of applying the polymer emulsion to brush filaments is by applying the polymer emulsion to the filaments via a spray mechanism just prior and during the mixing of the filaments. The filaments are well coated with the emulsion and then mixed thoroughly as they would be normally during the mixing process during brush manufacture. The filaments constitute the precursor to the paint-carrying fibers of the paintbrush prior to assembly of the paintbrush. The treated filaments contain from about 0.05% to about 20% fluoroacrylate or fluorourethane polymer or copolymer on the weight of the fiber preferably from about 0.1% to about 2%.

The type of paint use for which this invention is intended is water-based latex paints. Typically, these contain resins such as acrylics, epoxies, vinyls and others. Such paints are readily available in the marketplace under a number of major brands.

The paint applicators of the present invention have increased cleanability compared to traditional applicators which have not been surface treated with a fluoroacrylate or fluorourethane polymer or copolymer. Further, the paint applicators of the present invention have improved paint-carrying capacity compared to such traditional applicators. This is unexpected because these properties require opposite effects. Easier cleaning requires improved paint-releasing properties, while increased paint-carrying capacity requires improved paint-attracting properties. But the paint applicators of the present invention provide both easier cleaning and increased paint-carrying capacity. Other advantages of the present invention include a smoother painted surface due to less linting and improved durability of the paint applicator. Thus, the paint applicators of the present invention are useful for more efficient painting of surfaces and faster cleanup.

EXAMPLES

Example 1

The initial application was conducted on finished roller covers. The roller cover was dipped into a pad bath of water containing 10 g/L of HYDROPHOBOL XAN, 2 g/L of ALKANOL 6112, and 40 g/L of a fluoroacrylate polymer emulsion as described on page 5, lines 5-28 herein, wherein $R_f$ was $CF_3CF_2(CF_2)_x$ wherein x=6, 8, 10, 12, 14, 16 and 18 in the respective amounts of about 3%, 50%, 31%, 10%, 3%, 2% and 1%, R was H, $R_2$ was $C_{18}H_{37}$, m was 7, and containing 6% vinylidene chloride, said emulsion containing 25-31% polymer, 5-9% dipropylene glycol with the remainder water to total 100%. HYDROPHOBOL XAN is a blocked isocyanate extender available from Ciba Specialty Chemicals, High Point, N.C. ALKANOL 6112 is a wetting agent available from E.I. du Pont de Nemours and Company, Wilmington, Del. Once the roller was evenly treated, it was "wrung out" to remove the excess solution. Wet pick up of the roller was approximately 80-100%. Pile height on the rollers that were treated ranged from ½ inch (0.6 cm) to 1 inch (2.5 cm).

Example 2

Polyester fabric was obtained from Rock Valley Textiles (Janesville, Wis.) for treatment. Two separate types of fabric were treated (½ inch (0.6 cm) pile and ¾ inch (1.9 cm) pile). The fabric was 2¾ inches (7.0 cm) wide and 90 inches (228.6 cm) long. The fabric was treated via spray application. The surface of the fabric was sprayed with two different pad baths at two different concentration levels. Two pad baths of water (Compositions 1 and 2) contained concentrations of either 40 or 80 g/L of the fluoroacrylate polymer of Example 1, 7.5 g/L of HYDROPHOBOL XAN and 2 g/L of ALKANOL 6112, each available as described in Example 1. The other two pad baths of water (Compositions 3 and 4) contained either 80 or 160 g/L of a fluorourethane polymer emulsion as described on page 6, lines 8-29 herein, wherein the polyisocyanate was DESMODUR N-100; $R_f$—X—Y—H was $F(CF_2)_yCH_2CH_2OH$ wherein Y was 4, 6, 8, 10, 12, 14, 16 and 18 in the respective amounts of about 0-3%, 27-37%, 28-32%, 14-20%, 5-11%, 2-5%, 0-2% and 0-1%; and the water solvatable reagent was Carbowax 750, said emulsion containing 10-15% polymer with the remainder water to total 100%. These compositions are shown below in Table 1.

TABLE 1

| | Test Compositions | | | |
|---|---|---|---|---|
| Composition no. | 1 | 2 | 3 | 4 |
| FLUOROACRYLATE | 40 g | 80 g | | |
| FLUOROURETHANE | | | 80 g | 160 g |
| HYDROPHOBOL XAN | 7.5 g | 7.5 g | | |
| ALKANOL 6112 | 2 g | 2 g | | |
| Water | 950.5 g | 910.5 g | 920.0 | 840.0 |

After the pad bath was sprayed onto the surface of the fabric, the fabric was passed between press rollers. Then surface of fabric was resprayed to achieve the desired 50-60% wet pick up.

The fabric was dried for 1 hour at 180° F. (82° C.), then cured at 330° F.(166° C.) for 3 minutes.

Example 3

Polyester fabric was obtained as in Example 2. The fabric was treated with each of the above pad bath compositions disclosed in Table 1, using a laboratory-scale kiss coating padder. The face of the fabric was exposed to the pad bath and then the fabric was squeezed between two rollers at constant pressure. The fabric-wet pick up was approximately 42%. The fabric was dried/cured in one step at 330° F.(166° C.) for 5 minutes.

Example 4

A polyester fabric sample was obtained from Rock Valley Textiles (Janesville, Wis.). The fabric sample was approximately 24 inches (61.0 cm) wide and 65 inches (214.9 cm) long. The fabric was treated with a pad bath using a spray application as in Example 2; the wet pick up of the fabric was 10%. The pad bath contained 600 g/L fluoroacrylate polymer of Example 1 and 10 g/L 70% isopropyl alcohol and treatment was before the latex back coating of the fabric was applied. The fabric was ultimately used to manufacture roller covers with ½ inch (1.3 cm) pile height.

Example 5

A polyester fabric sample was obtained, treated and made into a roller as in Example 4, except that the wet pick up of the fabric was 20%.

Example 6

A polyester fabric sample was obtained, treated and made into a roller as in Example 4, except that the face of the fabric was treated with a pad bath using a foam application; the wet pick up of the fabric was 10%. The pad bath contained 600 g/L fluoroacrylate polymer of Example 1 and 10 g/L 70% isopropyl alcohol and treatment was before the latex back coating of the fabric was applied.

Example 7

A polyester fabric sample was obtained, treated and made into a roller as in Example 6, except that the back of the fabric was treated with the pad bath of Example 6 using a foam application; the wet pick up of the fabric was 10%.

Example 8

A polyester fabric sample was obtained, treated and made onto a roller as in Example 6, except that the wet pick up of the fabric was 20%.

Example 9

A polyester fabric sample was obtained, treated and made into a roller as in Example 7, except that the wet pick up of the fabric was 20%. There was difficulty in making the roller cover, so no data was accumulated for this treatment.

Example 10

The roller covers of Examples 2-9 and a control roller cover untreated with any fluorochemical were tested for paint-carrying capacity and cleanability as follows.

First, the paint roller cover was "broken in" to ensure that all of the air worked out of the cover before any pickup or release weights were measured. The following is a brief description of ASTM Method No. D 5069-92 which was employed herein.

The roller was installed onto the frame and then weighed. This weight was recorded and used to calculate the maximum paint pick up and release for the roller. The paint tray was filled with a latex paint so that the level was not any higher than the pile height of the fabric. For example, if the roller cover was ½ inch (1.3 cm) pile height, the paint depth was not more than ½ inch (1.3 cm) in the tray. The roller was then rolled into the paint so that the entire circumference was covered. The roller was then rolled out vertically onto a smooth primed sheet rock surface. The paint was applied over an area no more 2 feet (61.0 cm) in length by 14 inches (35.6 cm) wide. Numerous strokes of the roller in this area released the paint to the point where a suction sound was heard. This meant that air was present in the fibers. The roller was reloaded as stated earlier and the rollout repeated over the same painted area. Eventually, after repeated loadings, the roller no longer made the suction noise. At this point, before the roller was loaded again, the assembly was weighed and recorded. The cover was loaded again and used to paint in the same area with 6 strokes up and down. The assembly was weighed again. The roller cover reached a point of saturation where it could no longer release any more paint to the surface. This was apparent when the difference between the last weight measurement and the current weight measurement differ by 5 grams or less. At this point, the roller cover was fully broken in and was tested.

Then the performance of the roller was tested, using an expanded version of the above ASTM method. The painting surface used for testing was smooth sheet rock sealed with a white primer. When the maximum weight was reached as described above, the roller cover was brought to the paint substrate. A rectangle of a specific area was painted. The same numbers of strokes were taken with each roller tested to ensure the same opportunity for paint removal. After the painting of the rectangle was complete, the assembly was weighed again and the difference between this number and the fully loaded number was the discharge capacity of the roller cover in the given area. All discharge capacity numbers were graphed according to the various surface areas.

The roller covers were tested for cleanability as follows.

Clean up was a subjective test in that it was a timed cleaning as to when the technician judged the roller was "comfortably" clean. Considered was how fast the paint was released by simply running under the water. The roller always needed some sort of agitation induced into the fibers to work the paint from the base of the fibers near the backing yarn.

The resulting data from the above testing is shown in Tables 2 and 3. The following table headings for paint roller cover data were employed.

"Square feet painted" is the size of the area that was painted for each test. The area is painted as described above.

"Grams cover and frame" is the total weight of the paint roller before any paint is picked up on the fabric.

"Grams after loading" is the weight of the paint roller after the roller has been "broken in" and the most paint possible has been put onto the fabric of the roller cover.

"Grams picked up" is the exact weight of the paint picked up by the roller and is equal to (wt) "grams after loading" minus (wt) "grams cover and frame"="grams picked up".

"Grams after painting" is the weight of the paint roller after it has been used to paint the square foot area designated.

"Grams paint unloaded" is the exact weight of the paint released from the roller onto the wall during painting. "Grams after loading" minus "grams after painting"="grams paint unloaded".

"% Change" is the improvement in the paint released onto the wall from the treated roller cover compared to the untreated roller cover, and is equal to "grams paint unloaded (treated)" minus "grams paint unloaded (untreated)" divided by "grams paint unloaded (untreated)".

TABLE 2

| Untreated Roller Cover | | | | | |
|---|---|---|---|---|---|
| Square Feet Painted | Grams Cover and Frame | Grams After Loading | Grams picked up | Grams After Painting | Grams Paint Unloaded |
| 4 | 415 | 1035 | 620 | 971 | 64 |
| 9 | 415 | 1035 | 620 | 935 | 100 |
| 16 | 415 | 1035 | 620 | 882 | 153 |
| 24 | 415 | 1035 | 620 | 833 | 202 |
| 32 | 415 | 1035 | 620 | 796 | 239 |

| Roller Cover-Example 2 | | | | | | |
|---|---|---|---|---|---|---|
| Square Feet Painted | Grams Cover and Frame | Grams After Loading | Grams picked up | Grams After Painting | Grams Paint Unloaded | % Change |
| 4 | 418.3 | 1096 | 677.7 | 1010 | 86 | 34% |
| 9 | 418.3 | 1096 | 677.7 | 969 | 127 | 27% |
| 16 | 418.3 | 1096 | 677.7 | 899 | 197 | 29% |
| 24 | 418.3 | 1096 | 677.7 | 854 | 242 | 20% |
| 32 | 418.3 | 1096 | 677.7 | 804 | 292 | 22% |

| Roller Cover-Example 3 | | | | | | |
|---|---|---|---|---|---|---|
| Square Feet Painted | Grams Cover and Frame | Grams After Loading | Grams picked up | Grams After Painting | Grams Paint Unloaded | % Change |
| 4 | 418.1 | 1098 | 679.9 | 1002 | 96 | 50% |
| 9 | 418.1 | 1098 | 679.9 | 958 | 140 | 40% |
| 16 | 418.1 | 1098 | 679.9 | 911 | 187 | 22% |
| 24 | 418.1 | 1098 | 679.9 | 855 | 243 | 20% |
| 32 | 418.1 | 1098 | 679.9 | 811 | 287 | 20% |

Roller covers of Examples 2 and 3, treated via spray and kiss coat respectively, performed very well with respect to number of grams of paint gained during paint pick up and released during painting. The "handle" of the roller cover fabric treated via the kiss coat application was much more harsh than the "handle" for the spray application. "Handle" is used herein to mean the softness or harshness when touched. The harsher handle was due to a larger amount of product applied with the kiss coat application versus the spray application.

TABLE 3

| Roller Cover-Example 4 | | | | | | |
|---|---|---|---|---|---|---|
| Square Feet Painted | Grams Cover and Frame | Grams After Loading | Grams picked up | Grams After Painting | Grams Paint Unloaded | % Change |
| 4 | 272.4 | 777.4 | 505 | 704.4 | 73 | 7.67% |
| 9 | 272.4 | 777.4 | 505 | 674.9 | 102.5 | 8.35% |
| 16 | 272.4 | 777.4 | 505 | 641.8 | 135.6 | 15.31% |
| 24 | 272.4 | 777.4 | 505 | 606.8 | 170.6 | 15.74% |
| 32 | 272.4 | 777.4 | 505 | 569.7 | 207.7 | 13.81% |

| Roller Cover-Example 5 | | | | | | |
|---|---|---|---|---|---|---|
| Square Feet Painted | Grams Cover and Frame | Grams After Loading | Grams picked up | Grams After Painting | Grams Paint Unloaded | % Change |
| 4 | 273.4 | 781.2 | 507.8 | 726.9 | 54.3 | −19.91% |
| 9 | 273.4 | 781.2 | 507.8 | 694.6 | 86.6 | −8.46% |
| 16 | 273.4 | 781.2 | 507.8 | 660.5 | 120.7 | 2.64% |
| 24 | 273.4 | 781.2 | 507.8 | 618.4 | 162.8 | 10.45% |
| 32 | 273.4 | 781.2 | 507.8 | 573.5 | 207.7 | 13.81% |

| Roller Cover-Example 6 | | | | | | |
|---|---|---|---|---|---|---|
| Square Feet Painted | Grams Cover and Frame | Grams After Loading | Grams picked up | Grams After Painting | Grams Paint Unloaded | % Change |
| 4 | 272.5 | 786.9 | 514.4 | 721.4 | 65.5 | −3.39% |
| 9 | 272.5 | 786.9 | 514.4 | 694.9 | 92 | −2.75% |
| 16 | 272.5 | 786.9 | 514.4 | 670.6 | 116.3 | −1.11% |
| 24 | 272.5 | 786.9 | 514.4 | 625.5 | 161.4 | 9.50% |
| 32 | 272.5 | 786.9 | 514.4 | 588.1 | 198.8 | 8.93% |

| Roller Cover-Example 7 | | | | | | |
|---|---|---|---|---|---|---|
| Square Feet Painted | Grams Cover and Frame | Grams After Loading | Grams picked up | Grams After Painting | Grams Paint Unloaded | % Change |
| 4 | 274.5 | 776.6 | 502.1 | 710.9 | 65.7 | −3.10% |
| 9 | 274.5 | 776.6 | 502.1 | 674.1 | 102.5 | 8.35% |

TABLE 3-continued

| 16 | 274.5 | 776.6 | 502.1 | 648.1 | 128.5 | 9.27% |
| 24 | 274.5 | 776.6 | 502.1 | 610.2 | 166.4 | 12.89% |
| 32 | 274.5 | 776.6 | 502.1 | 578.8 | 197.8 | 8.38% |

Roller Cover-Example 8

| Square Feet Painted | Grams Cover and Frame | Grams After Loading | Grams picked up | Grams After Painting | Grams Paint Unloaded | % Change |
| --- | --- | --- | --- | --- | --- | --- |
| 4 | 273.4 | 784.5 | 511.1 | 711.2 | 73.3 | 8.11% |
| 9 | 273.4 | 784.5 | 511.1 | 680.2 | 104.3 | 10.25% |
| 16 | 273.4 | 784.5 | 511.1 | 653.1 | 131.4 | 11.73% |
| 24 | 273.4 | 784.5 | 511.1 | 609.7 | 174.8 | 18.59% |
| 32 | 273.4 | 784.5 | 511.1 | 575.1 | 209.4 | 14.74% |

Roller Cover-Untreated

| Square Feet Painted | Grams Cover and Frame | Grams After Loading | Grams picked up | Grams After Painting | Grams Paint Unloaded |
| --- | --- | --- | --- | --- | --- |
| 4 | 264.4 | 771.3 | 506.9 | 703.5 | 67.8 |
| 9 | 264.4 | 771.3 | 506.9 | 676.7 | 94.6 |
| 16 | 264.4 | 771.3 | 506.9 | 653.7 | 117.6 |
| 24 | 264.4 | 771.3 | 506.9 | 623.9 | 147.4 |
| 32 | 264.4 | 771.3 | 506.9 | 588.8 | 182.5 |

Roller covers of Examples 4 and 5 were treated via spray application, and of Examples 6 through 8 were treated via foam application to the roller cover fabric with 10-20% wet pick up. The amount of paint picked up by the roller cover as well as released on to the wall was increased with both applications as compared to the untreated roller cover. A lower amount of treatment product retained (due to excessive shearing of the fiber length during manufacture of the roller cover) by the roller cover fabric of Examples 4 and 5 (spray application), as compared to the initial spray application data in Table 2 for Examples 2 and 3, caused slightly lower numbers with respect to paint release and pick up. Example 6 was prepared with 10% wet pickup and the polymer treatment was applied to the front of the fabric so shearing of the fiber length during manufacture of the roller cover removed more treated fibers resulting in lower % change. Example 7 was prepared with 10% wet pickup with the treatment applied to the back of the fabric so shearing of the fiber length during manufacture had less effect, and better performance was obtained as reflected in the % change. Example 8 was prepared with 20% wet pickup with the treatment applied to the front of the fabric so it had better performance due to the higher wet pickup.

Cleaning time of a treated roller cover versus an untreated roller cover was 45-55 seconds versus 60-70 seconds, on average. A 25% cleaning time reduction was seen. This was based on averages across a number of different rollers.

Example 11

Compositions 5-8 as shown in Table 4 were applied to the surface of paintbrushes. The initial application was conducted on polybutylene terephthalate (PBT) filaments in 0.5 gram bundles. The PBT filaments were dipped into a pad bath containing polymer, HYDROPHOBOL XAN, and water in the amounts shown in Table 4 below. The polymer composition was a blend of 7-9% fluoroacrylate polymer of Example 1, 5-6% fluorourethane polymer of Example 2, 0-1% sodium dodecylbenzenesulfonate with the remainder water to total 100%. HYDROPHOBAL XAN is a blocked isocyanate extender available from Ciba Specialty Chemicals, High Point, N.C. The filaments were then cured at 100° C. for 10 minutes.

TABLE 4

| | weight in grams | | | |
| --- | --- | --- | --- | --- |
| Composition No. | 5 | 6 | 7 | 8 |
| POLYMER BLEND | 0.7 | 1.4 | 2.0 | 2.6 |
| HYDROPHOBOL XAN | 0.1 | 0.2 | 0.3 | 0.4 |
| WATER | 9.2 | 8.4 | 7.7 | 7.1 |

Composition 5 in Table 4 was the least sticky and did not cause the filaments to adhere to themselves. Compositions 6 to 8 were very sticky, and the filaments were prone to adhere to themselves. Composition 5 was used in further examples.

Example 12

Composition 5 of Table 4 was applied on polybutylene terephthalate (PBT) filaments in approximately 172 g batches before brush manufacture. The PBT filaments were sprayed (making sure not to coat the butt of the filaments) using a spray bottle containing a pad bath of 70 g/L of the polymer blend of Example 11, 10 g/L HYDROPHOBOL XAN, and water (Composition 5) and mixed by hand. This process was repeated 3 times and then the filaments were allowed to dry. A total of five pounds of filaments was treated and put through brush manufacture. The filaments were mixed, placed into the ferrule, epoxy was added followed by a cure step (150° C.) and handles were attached. The filaments had approximately a 10-20% wet pick up of bath, 0.5-1.0% product on the weight of the filaments.

Example 13

The polymer blend of Example 11 was applied on PBT filaments in a 2.5 pound batch during brush manufacture. The PBT filaments were sprayed (making sure not to cover the butt of the filaments) using a sprayer similar to an insecticide applicator containing a pad bath of 70 g/L of the polymer blend of Example 11 during the mixing step of manufacture. The filaments were then placed into the ferrule, epoxy was added followed by a cure step (150° C.) and handles were attached.

Example 14

The paintbrushes of Examples 12 and 13 were tested as follows. After paintbrushes were assembled, the brush was weighed. Then the filament portion was dipped into latex paint for 15 seconds, and allowed to drip for 30 seconds. The brush was weighed again and then a piece of sheet rock was painted with 30 brush strokes. The brush was then weighed again. The amount of paint released from the brush and picked up onto the brush after dripping was noted by weight differences. The treated brush was compared directly to an untreated brush. The following results apply to both Examples 12 and 13.

The amount of paint released from the paintbrush and the amount of paint picked up by the paintbrush was not diminished by the treatment with a fluorochemical. There was a slight improvement with the fluorochemical treatment. The cleaning of the brushes was tested immediately after use, 5 hours after use, and 15 hours after use. The cleaning times of the untreated brushes were compared the treated brushes after all three time periods. The cleaning time of the treated brushes was substantially improved over the untreated brushes, with the benefit increasing with the length of time before cleaning. The cleaning time of the newly wet paint from the brush was not substantially improved with a treated brush versus an untreated brush. But after 5 hours, the semi-dried paint was removed from the filaments in, on average, 1 minute on a treated brush versus an average of 3 minutes on an untreated brush. After 15 hours, the semi-dried paint was removed from the filaments in an average of 3 minutes on a treated brush versus an average of 7 minutes on an untreated brush.

What is claimed is:

1. A paint applicator comprising a paint-carrying substrate surface comprising a fabric, fibers, or filaments which is coated or treated with a fluoroacrylate polymer or copolymer, a fluorourethane polymer or copolymer, or a mixture thereof, said surface carrying a water based latex paint.

2. The paint applicator of claim 1 wherein the fluoroacrylate polymer or copolymer contains at least 50% by weight of an alkyl (meth)acrylate group having a perfluoroalkyl group of from 2 to about 20.

3. The paint applicator of claim 1 wherein the fluoroacrylate polymer or copolymer comprises monomers copolymerized in the following percentages by weight (a) from about 50% to about 85% of a monomer of formula I:

$$R_f-CH_2CH_2-OC(O)-C(R)=CH_2 \quad \text{I}$$

(b) from about 10% to about 25% of a monomer of formula II:

$$R_2-OC(O)-C(R)=CH_2 \quad \text{II}$$

(c) from 0.1% to about 5% of a monomer of the formula III $$HO-CH_2CH_2-OC(O)-C(R)=CH_2 \quad \text{III}$$

(d) from 0.1% to about 5% of a monomer of the formula IV:

$$H-(OCH_2CH_2)_m-O-C(O)-C(R)=CH_2 \quad \text{IV}$$

(e) from 0.1% to about 3% of a monomer of the formula V:

$$HO-CH_2-NH-C(O)-C(R)=CH_2 \quad \text{V}$$

wherein $R_f$ is a straight or branched-chain perfluoroalkyl group of from 2 to about 20 carbon atoms, each R is independent H or $CH_3$; $R_2$ is an alkyl chain with 2 to about 18 carbon atoms; and m is 2 to about 10.

4. The paint applicator of claim 3 further comprising from 0% to about 10% of vinylidene chloride of formula VI $$CH_2=CCl_2 \quad \text{VI}$$

or vinyl acetate of formula VII $$CH_3-(O)COCH=CH_2 \quad \text{VII}$$

or a mixture thereof.

5. The paint applicator of claim 1 wherein the fluorourethane polymer has at least one urea group and is the reaction product of
(A) at least one organic polyisocyanate or mixture of organic polyisocyanates which contains at least three isocyanate groups per molecule,
(B) at least one fluorochemical compound of the following composition:
$R_f$—X—Y—H, wherein $R_f$ is a $C_2$-$C_{20}$ linear or branched fluoroalkyl group, X is —$(CH_2)_n$— or —$SO_2N(R_2)$ $CH_2CH_2$—, Y is —O—, —S—, or —$N(R_2)$—, n is 2; and $R_2$ is H or an alkyl group containing 1-6 carbons,
(C) one or more hydrophilic, water-solvatable reagents which contain a single functional group which has at least one reactive H, and thereafter
(D) water in an amount to react with from about 5% to 100% of the remainder of the said isocyanate groups.

6. The paint applicator of claim 1 wherein the paint-carrying surface has been coated or treated with from about 0.05% to about 20% fluoroacrylate or fluorourethane on weight of substrate.

7. A method of treating a paint applicator comprising application to its paint-carrying surface, or the precursor of said surface, of a fluoroacrylate polymer or copolymer, a fluorourethane polymer or copolymer, or a mixture thereof wherein a water based latex paint is subsequently applied to the paint-carrying substrate surface said surface comprising a fabric, fibers, or filaments.

8. The method of claim 7 wherein the fluoroacrylate polymer or copolymer comprises monomers copolymerized in the following percentages by weight
(a) from about 50% to about 85% of a monomer of formula I:

$$R_f-CH_2CH_2-OC(O)-C(R)=CH_2 \quad \text{I}$$

(b) from about 10% to about 25% of a monomer of formula II:

$$R_2-OC(O)-C(R)=CH_2 \quad \text{II}$$

(c) from 0.1% to about 5% of a monomer of the formula III $$HO-CH_2CH_2-OC(O)-C(R)=CH_2 \quad \text{III}$$

(d) from 0.1% to about 5% of a monomer of the formula IV:

$$H-(OCH_2CH_2)_m-O-C(O)-C(R)=CH_2 \quad \text{IV}$$

(e) from 0.1% to about 3% of a monomer of the formula V:

$$HO-CH_2-NH-C(O)-C(R)=CH_2 \quad \text{V}$$

wherein $R_f$ is a straight or branched-chain perfluoroalkyl group of from 2 to about 20 carbon atoms, each R is independently H or $CH_3$; $R_2$ is an alkyl chain with 2 to about 18 carbon atoms; and m is 2 to about 10.

9. The method of claim 8 further comprising from 0% to about 10% of vinylidene chloride of formula VI $$CH_2{=}CCl_2 \qquad\qquad VI$$

or vinyl acetate of formula VII $$CH_3{-}(O)COCH{=}CH_2 \qquad\qquad VII$$

or a mixture thereof.

10. The method of claim 7 wherein the fluorourethane polymer or copolymer has at least one urea group and is the reaction product of:
(A) at least one organic polyisocyanate or mixture of organic polyisocyanates which contains at least three isocyanate groups per molecule,
(B) at least one fluorochemical compound of the following composition:
$R_f{-}X{-}Y{-}H$, wherein $R_f$ is a $C_2$-$C_{20}$ linear or branched fluoroalkyl group, X is $-(CH_2)_n-$ or $-SO_2N(R_2)CH_2CH_2-$; Y is $-O-$, $-S-$, or $-N(R_2)-$; n is 2; and $R_2$ is H or an alkyl group containing 1-6 carbons,
(C) one or more hydrophilic, water-solvatable reagents which contains a single functional group which has at least one reactive H, and thereafter
(D) water in an amount to react with from about 5% to 100% of the said isocyanate groups.

11. The method of claim 7 wherein the paint-carrying surface has been coated or treated with from about 0.05% to about 20% fluoroacrylate or fluorourethane on weight of substrate.

12. A paint applicator treated by the method of claim 7.

* * * * *